J. H. TAYLOR.
PIPE COUPLING.
APPLICATION FILED NOV. 22, 1909.
1,078,009.
Patented Nov. 11, 1913.
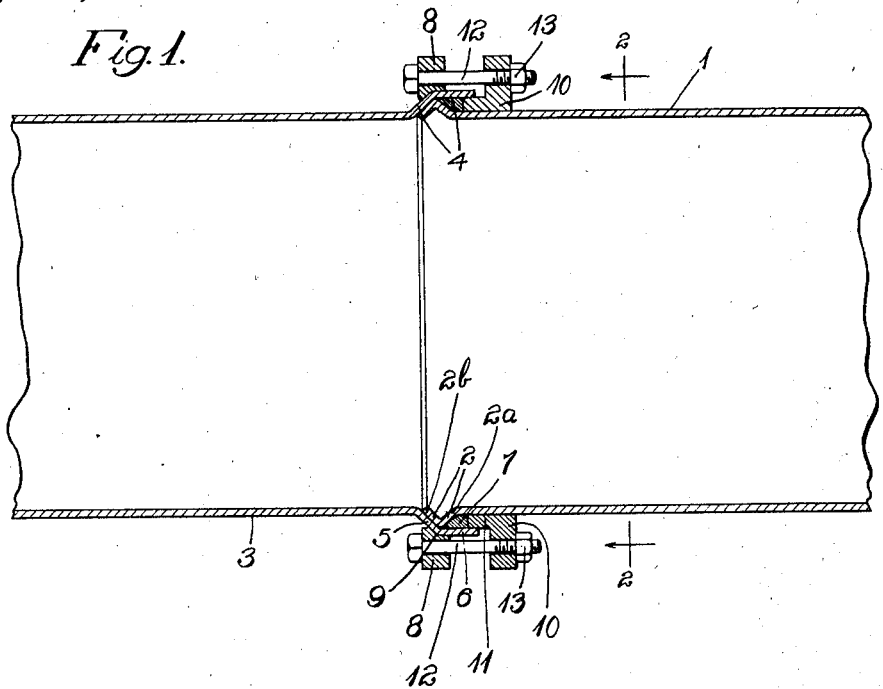
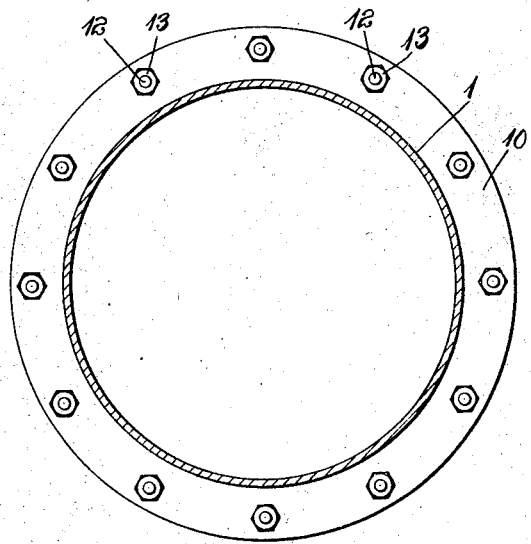
Witnesses
George E. Higham.
Leonard W. Novander.
Inventor
James Hall Taylor
By Brown & William
Attorneys

UNITED STATES PATENT OFFICE.

JAMES HALL TAYLOR, OF CHICAGO, ILLINOIS.

PIPE-COUPLING.

1,078,009.

Specification of Letters Patent.

Patented Nov. 11, 1913.

Application filed November 22, 1909. Serial No. 529,275.

*To all whom it may concern:*

Be it known that I, JAMES HALL TAYLOR, a citizen of the United States, residing at Chicago, in the county of Cook and State of Illinois, have invented a certain new and useful Improvement in Pipe-Couplings, of which the following is a full, clear, concise, and exact description, reference being had to the accompanying drawings, forming a part of this specification.

My invention relates to pipe couplings and has particular reference to a form of coupling which is adapted to be used with large pipes or tubes constructed of metal.

In couplings or joints which have been made in metallic pipes in the past one of the greatest objections has been that no adequate means was provided to prevent the two pipes which were joined, from being pulled apart in case excessive pressure was exerted.

According to my improved construction the inner pipe which forms part of the joint is provided with an annular projection which fits within the socket which is provided on the end of its fellow pipe forming the joint. This socket is preferably made with an outer portion, the wall of which is parallel with the main axis of the pipe, and a second portion which connects this outer part with the main wall of the pipe. The annular projection provided on the second pipe the end of which fits within this socket, is preferably provided with a surface which is parallel with the portion of the socket which connects the main part of the pipe with the outer portion of the socket which is parallel with the main axis of the pipe. In this way a good joint is formed when the end of the pipe having the annular projection is forced within the socket end of its companion pipe, and packing may be placed within the socket on either side of the annular projection, although I prefer to place this packing on the side away from the end of the pipe. A ring is provided on the first pipe which abuts against the projecting socket end, and a second ring is provided on the second pipe, this ring being provided with an abutment which is adapted to project into the annular space between the second pipe and the wall of the socket of the first pipe. When packing is placed in this annular space it is evident that the second or follower ring may be forced against this packing by means of suitable bolts which connect the follower ring with the clamping ring, and the packing forms a tight joint, and at the same time the pipes are absolutely prevented from becoming separated from each other.

According to the construction of my invention, as more pressure is exerted on the packing by means of the follower ring, the two pipes which form the joint are drawn more tightly together, and on account of the annular projection on the inner of the two pipes it becomes quite impossible to separate the pipes by exerting longitudinal pressure in a direction away from the joint. The greater such longitudinal pressure which is so exerted, the more firmly the packing material will be compressed between the inner portion of the socket of the pipe forming the outer part of the joint, the annular projection of the pipe forming the inner part of the joint, and the abutment projecting from the follower ring. These and other advantages of my invention will become more apparent by reference to the accompanying drawings, in which—

Figure 1 is a vertical longitudinal section through the parts which form the coupling or joints, and Fig. 2 is a section on the line 2—2 of Fig. 1.

The pipe 1 is provided with a V-shaped annular projection 2. This projection is formed of metal which has the same thickness as the main portion of the pipe and consists of an angular portion 2ª which is away from, and a second angular portion 2ᵇ which is adjacent to, the end of the pipe. The pipe 3 which is to be joined to the pipe 1 is provided with a socket 4, this socket being made up of an angular annular portion 5, and a second annular portion 6, which is preferably parallel to the main axis of the pipe 3. The metal forming this socket is preferably of the same thickness as the main portion of the pipe 3. The portion 5 of the socket 4 is preferably made parallel with the portion 2ᵇ of the annular projection 2, so that when the two pipes are placed together a tight fit is thus effected. A ring of packing material 7 is placed within the socket 4, occupying a position between the portion 6 of the pipe 3 and the portion 2ª of the annular projection 2, and extending slightly along the main wall of the pipe 1.

A clamping ring 8 is provided on the pipe 3, this ring being provided with an annular groove 9, so that the ring 8 is allowed to abut against the outer portion of the socket of the pipe 3. A slidable follower ring 10 is provided in connection with pipe 1, this ring being provided with an abutment portion 11 which is adapted to fit between the outer surface of pipe 1 and the inner surface of the annular portion 6 of the pipe 3. The rings 8 and 10 are provided with a number of bolt holes, as shown in Fig. 2, and through these holes pass the bolts 12, 12, provided with nuts 13, 13. It is evident that as the nuts 13, 13 are screwed up, the abutment portion 11 of the ring 10 will be forced against the packing ring 7, and a tight joint will be formed. At the same time the portion $2^b$ of the annular projection 2 is forced against the portion 5 of the socket 4. It is now impossible to separate the pipes 1 and 3, inasmuch as the V-shaped annular projection 2 cannot be pulled past the packing material 7 and the abutment portion of the ring 10. Moreover the ring 8 can not be pulled over the socket portion of the pipe 3 on account of its abutment against the socket of this pipe.

It is clear that many changes could be made in the detailed construction of the parts which I have described without departing from the spirit of my invention. For example, the end of the pipe 1, instead of being formed into a V-shaped projection, can be merely flared outwardly in order to form an abutment surface for the packing 7.

Again, a tight joint may be formed without the use of any packing at all, by means of compressing the portion $2^b$ of the annular projection 2 against the portion 5 of the socket 4 by the action of the abutment portion 11 of the follower ring 10.

What I claim as new and desire to cover by United States Letters Patent is:

In a pipe coupling, in combination, a pipe section enlarged at the end to form an oblique shoulder and a socket of otherwise uniform diameter, a second pipe section having a V-shaped bead at the end thereof and having this end disposed in said socket so that one face of said bead will lie against said oblique shoulder, a clamping member disposed on the outside of said last-named section and extending into said socket in alinement with said bead, the face of the entering portion of said clamping member and the other face of said bead being of substantially the same width measured at right angles to the axis of the pipe, and means for mechanically connecting said clamping member to said first-named section.

In witness whereof, I hereunto subscribe my name this 15th day of November, A. D. 1909.

JAMES HALL TAYLOR.

Witnesses:
HENRY M. HUXLER,
LEONARD W. NOVANDER.